United States Patent
Majumder

(10) Patent No.: US 11,056,890 B2
(45) Date of Patent: Jul. 6, 2021

(54) MICROGRID CONTROL SYSTEM AND METHOD THEREOF

(71) Applicant: ABB Power Grids Switzerland AG, Baden (CH)

(72) Inventor: Ritwik Majumder, Västerås (SE)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/764,977

(22) PCT Filed: Nov. 23, 2017

(86) PCT No.: PCT/EP2017/080143
§ 371 (c)(1),
(2) Date: May 18, 2020

(87) PCT Pub. No.: WO2019/101311
PCT Pub. Date: May 31, 2019

(65) Prior Publication Data
US 2020/0335977 A1    Oct. 22, 2020

(51) Int. Cl.
*H02J 3/38*    (2006.01)
(52) U.S. Cl.
CPC .............. *H02J 3/388* (2020.01); *H02J 3/381* (2013.01)
(58) Field of Classification Search
CPC ........ H02J 3/388; H02J 3/381; H02J 2300/10; H02J 2310/10; H02J 3/42
See application file for complete search history.

(56) References Cited

U.S. PATENT DOCUMENTS

| 9,454,137 B2 | 9/2016 | Brainard et al. |
| 2011/0248569 A1 | 10/2011 | Son et al. |
| 2011/0282507 A1 | 11/2011 | Oudalov et al. |

(Continued)

FOREIGN PATENT DOCUMENTS

| CN | 203883552 U | 10/2014 |
| CN | 106253348 A | 12/2016 |

(Continued)

OTHER PUBLICATIONS

A. Maitra et al., "Microgrid Controllers : Expanding Their Role and Evaluating Their Performance," in IEEE Power and Energy Magazine, vol. 15, No. 4, pp. 41-49, Jul.-Aug. 2017, doi: 10.1109/MPE.2017.2690519. (Year: 2017).*

*Primary Examiner* — Daniel Cavallari
(74) *Attorney, Agent, or Firm* — Slater Matsil. LLP

(57) ABSTRACT

A microgrid arrangement includes a decentralized microgrid control system, a first microgrid and a second microgrid separated by a microgrid breaker. The first and second microgrids each include a number of assets, each asset being associated with a respective microgrid controller (MGC) of the microgrid control system. The control system can be operated by determining that the microgrid breaker is open, assigning a first MGC in the first microgrid to a first group of MGCs in the first microgrid, broadcasting information from the first MGC to other MGCs in the first group, determining that the microgrid breaker is closed, assigning the first MGC to a second group of MGCs in both the first microgrid and the second microgrid, and broadcasting information from the first MGC to MGCs in the second group.

20 Claims, 7 Drawing Sheets

(56) References Cited

U.S. PATENT DOCUMENTS

| | | |
|---|---|---|
| 2012/0283888 A1 | 11/2012 | Mao et al. |
| 2013/0187454 A1 | 7/2013 | Timbus et al. |
| 2014/0249686 A1* | 9/2014 | Brainard .................. H02J 3/08 700/286 |
| 2016/0190790 A1 | 6/2016 | Oudalov et al. |
| 2016/0254666 A1 | 9/2016 | Curtiss et al. |
| 2017/0176965 A1 | 6/2017 | Martin Lloret et al. |
| 2018/0026446 A1* | 1/2018 | Gonzalez Espin ....... H02J 3/28 307/23 |
| 2018/0301903 A1 | 10/2018 | Majumder et al. |

FOREIGN PATENT DOCUMENTS

| | | |
|---|---|---|
| WO | 2016055084 A1 | 4/2016 |
| WO | 2016126263 A1 | 8/2016 |
| WO | 2016200398 A1 | 12/2016 |
| WO | 2017097380 A1 | 6/2017 |

\* cited by examiner

MICROGRID CONTROL SYSTEM AND METHOD THEREOF

CROSS-REFERENCE TO RELATED APPLICATIONS

This patent application is a national phase filing under section 371 of PCT/EP2017/080143, filed Nov. 23, 2017, which is incorporated herein by reference in its entirety.

TECHNICAL FIELD

The present disclosure relates to a method and devices for controlling a microgrid.

BACKGROUND

A microgrid is a localized grouping of electricity generation, energy storage, and loads that normally operate connected to a traditional centralized grid (power distribution grid or macrogrid) via a point of common coupling (PCC). This single point of common coupling with the macrogrid can be disconnected, islanding the microgrid. Microgrids are part of a structure aiming at producing electrical power locally from many small energy sources, Distributed Generators (DGs). In a microgrid, a DG is connected via a converter which controls the output of the DG, i.e., the current injected into the microgrid. Or the DG can be a synchronous machine directly connected to the microgrid.

A microgrid (in grid connected mode, i.e., connected to the distribution grid) supplies the optimized or maximum power outputs from the connected DG sites and the rest of the power is supplied by the distribution grid. The microgrid is connected to the distribution grid at a PCC through a controllable switch/breaker. This grid connection is lost when the breaker is open during grid fault and the microgrid is islanded.

A microgrid is controlled by a controller, which may be centralized or distributed, which, e.g., controls DGs in accordance with voltage or current control schemes. One of the aspects of microgrid control is efficient control of the grid interface at the PCC. Various conditions, e.g., power flow, voltage, disconnection or power factor at the PCC impose different control requirement within the microgrid.

There are various methods to control the grid interface and one of them is to have a dedicated network controller. The network controller can monitor and communicate different system conditions to other controllers within the microgrid (e.g., status of the grid circuit breaker). The network controller can participate in various functions such as black start, resynchronization, planned islanding, voltage droop for the microgrid as well as power factor correction. For instance, a breaker controller may communicate the breaker status (open or closed) to a microgrid network controller which then informs the DG controllers of the microgrid. Further, set-points, e.g., power 0 voltage set-points, may be sent from the network controller to the DG controllers, and measured output power and/or voltage may be sent from the DG controllers to the network controller. Also information about tripping of a DG may be sent from the associated DG controller to the network controller.

US 2013/0187454 discloses a method for detecting islanding by detecting the opening of a breaker. Information about the breaker opening is sent to the DGs of the islanded network.

WO 2016/055084 discloses a wireless communication network of a microgrid communication system, in which non-time critical data is communicated as point-to-point during normal operation and time critical data is broadcasted to all receiving nodes during islanding.

A plurality of microgrids, or segments of a microgrid, can be clustered together to form so called nested microgrids where the there are connections between the different microgrids which may be interrupted by the opening of breakers. There is then a problem in how to control the nested microgrids, not only depending on connection to the distribution grid, but also depending on whether there is a connection to the other microgrid(s) or not.

U.S. Pat. No. 9,454,137 discloses a microgrid system comprising a plurality of microgrids connected to each other via breakers and to a utility grid via a main breaker. A system controller controls a microgrid controller of each microgrid, but may for security reason not have direct control of the individual elements of the microgrids. Each microgrid controller controls the power sources of its microgrid by communication with power source controllers depending on whether the microgrid is operating autonomously, disconnected from the utility grid, or not. The microgrid controllers communicate with each other, both when islanded and when connected, e.g., exchanging information about whether there is a distribution grid signal or not.

SUMMARY

Embodiments of the present invention provide an improved way of handling communication between different decentralized microgrid controllers in an arrangement of nested electrical power microgrids, depending on whether two of the nested microgrids are connected to or disconnected from each other by means of a circuit breaker.

According to an aspect of the present invention, there is provided a method of a microgrid control system comprised in a microgrid arrangement. The microgrid arrangement comprises at least a first microgrid and a second microgrid. The microgrids are separated by a microgrid breaker in the microgrid arrangement, which breaker connects the first and second microgrids when closed (conducting) and disconnects the first and second microgrids when open (not conducting). Each of the first and second microgrids comprises a plurality of assets. Each asset is associated with a respective microgrid controller (MGC) of the microgrid control system. The method comprises determining that the microgrid breaker is open. The method also comprises, based on the determination that the microgrid breaker is open, for at least one MGC of the MGCs in the first microgrid, assigning the MGC to a first group of MGCs in the first microgrid. The method also comprises the MGC broadcasting information to the MGCs in the first group. The method also comprises determining that the microgrid breaker is closed. The method also comprises, based on the determination that the microgrid breaker is closed, assigning the MGC to a second group of MGCs. At least one of the MGCs in the second group is comprised in the first microgrid and least one of the MGCs in the second group is comprised in the second microgrid. The method also comprises the MGC broadcasting information to the MGCs in the second group. In some embodiments, at least one MGC of the MGCs in the first and/or the second microgrid controls the grid connection at a PCC, and this MGC is herein called a network controller.

According to another aspect of the present invention, there is provided a computer program product comprising computer-executable components for causing a microgrid control system to perform the method of any preceding example when the computer-executable components are run on processing circuitry comprised in the microgrid control system.

According to another aspect of the present invention, there is provided a microgrid control system for a microgrid arrangement comprising at least a first microgrid and a second microgrid separated by a microgrid breaker and each comprising a plurality of assets. The microgrid control system comprises a respective MGC configured for being associated with each of the assets, processing circuitry, and data storage storing instructions executable by the processing circuitry whereby the control system is operative to determine that the microgrid breaker is open. The system is also operative to, based on the determination that the microgrid breaker is open, for at least one MGC of the MGCs in the first microgrid, assign the MGC to a first group of MGCs in the first microgrid. The system is also operative to, by means of the MGC, broadcast information to the MGCs in the first group. The system is also operative to determine that the microgrid breaker is closed. The system is also operative to, based on the determination that the microgrid breaker is closed, assign the MGC to a second group of MGCs in both the first microgrid and the second microgrid. The system is also operative to, by means of the MGC, broadcast information to the MGCs in the second group.

According to another aspect of the present invention, there is provided a microgrid arrangement comprising an embodiment of the microgrid control system of the present disclosure, and the at least a first microgrid and a second microgrid separated by the microgrid breaker and each comprising the plurality of assets.

By grouping an MGC differently depending on whether the breaker is closed or open (i.e., conducting or not conducting), communication in a decentralized control system may be more conveniently handled. Information may be sent (broadcasted) to the relevant other controllers directly, without the need for a central unit receiving the information and relaying it to the suitable recipients. Typically, fewer controllers should be broadcasted to if the breaker is open, i.e., the first group contains fewer MCGs than the second group, since the MGCs in the second microgrid do not need the information. Also, grouping may help in microgrid control where more than one asset participates, e.g., voltage control from two storages in respective microgrids may be coordinated better if they are in the same group and may exchange information when connected electrically via the microgrid breaker. When the breaker is open, they are electrically disconnected why they may not need to be coordinated.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION OF ILLUSTRATIVE EMBODIMENTS

Figure 1:
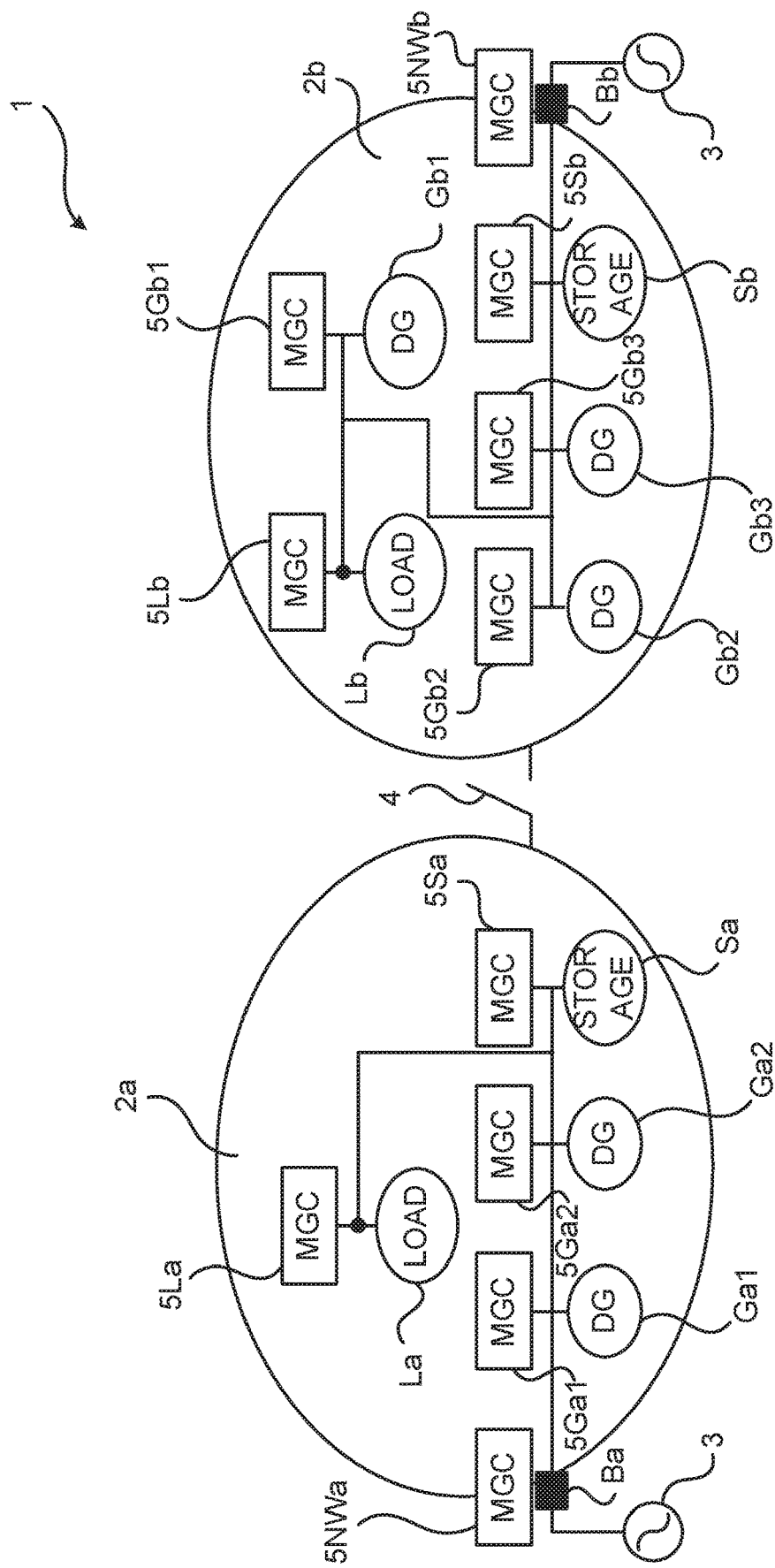
FIG. 1 is a schematic illustration of two nested microgrids and their respective assets and controllers thereof, in accordance with an embodiment of the present invention.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

A "microgrid" is herein regarded as any electrical power network comprising a plurality of assets, each associated with a microgrid controller, e.g., any number of DG(s), breaker(s), storage(s) and/or load(s). A microgrid may be connected to a distribution grid via a PCC, comprising a grid breaker and associated network controller, or be not connected to a distribution grid, thus not comprising a grid breaker and associated network controller. Such a not connected microgrid may also be regarded as a segment of a larger (distribution grid connected) microgrid. Thus, herein, any distribution grid connected microgrid, as well as a segment thereof, is regarded as a microgrid.

The present invention is related to a microgrid arrangement comprising a plurality of interconnectable microgrids, so called nested microgrids.

A challenge with nested microgrids is the control of the adjoined system, i.e., when the microgrids of the arrangement are connected to each other by a breaker being in its closed position. Each of the microgrids will have its own network (NW) controller and some of the reasonable choices for the system control include:

1. Master slave—where one NW controller controls the other(s).
2. Equal with Rotation, Event etc., where both NW controllers participate in the overall system control.

In both these cases, the amount of information exchanged increases for each controller. Each of the microgrid assets may have its local controller, e.g., in a decentralized control system, and these controllers may broadcast locally measured values, e.g., real and reactive power, current, voltage and/or frequency at the asset interface with a bus of the microgrids, and any other local parameters, e.g., connection status, to the other controllers and receive similar information from them.

In embodiments of the present invention, the information exchange between the local controllers may be optimized by grouping them in a more adaptive way based on how many microgrids they are connected with.

In this proposed method the connecting breaker (between two microgrids) status is used to group the local controllers for information exchange. These may also be useful for calculating other functions like power balance, voltage control, spinning reserve etc. for, e.g., an islanded network.

Embodiments of the present invention relate to the selection of the MGC groups for exchanging measured values and/or parameters in nested microgrid scenarios. A communication interface of any or each of the MGCs in the microgrid arrangement may receive information about the breaker status, typically open or closed, and based on the status the MGC may select a group of other MGCs for broadcasting and receiving measured values and local parameters. The forming of such broadcasting groups does not preclude point-to-point signaling to MGC(s) within or outside of the group of an MGC.

More specifically, the MGCs of a microgrid arrangement control system may be grouped based on a status (open/closed) of a microgrid breaker between a first and a second microgrid in the arrangement. In case of more than two microgrids being comprised in the arrangement, the grouping may be based on the respective status of any number of such microgrid breakers between any of the plurality of microgrids in the arrangement. If the microgrid breaker is closed, connecting the first and second microgrids to each other, the MGC may send and receive, by broadcast over its communication interface, information to all other MGCs in both the first and the second microgrids, or a selection of MGCs from both the first and the second microgrids. On the other hand, if the microgrid breaker is open, the MGC may exchange information only with other MGC(s) in its own microgrid.

FIG. 1 illustrates a microgrid arrangement 1 comprising a plurality of microgrids 2, here a first microgrid 2a and a second microgrid 2b, separated by a microgrid breaker 4 which may be in an open position (i.e., not conducting), electrically disconnecting the first and second microgrids from each other, or in a closed position (i.e., conducting), electrically connecting (e.g., reconnecting) the first and second microgrids to each other. Each microgrid 2 comprises a plurality of assets, e.g., comprising any load(s) L, DG(s) G, grid breaker(s) B and energy storage(s) S. Each asset is associated with a respective controller (MGC) 5 of the control system of the arrangement 1, for controlling the asset, e.g., its output to a bus with which it is connected in the microgrid it is comprised in. Thus, each load L is associated with a respective load controller 5L, each DG G is associated with a respective DG controller 5G, each grid breaker B is associated with a respective NW controller 5NW and each energy storage S is associated with a respective storage controller 5S. Each of the microgrids 2 in the arrangement 1 may or may not be connectable one, or a plurality of, distribution grid 3 at at least one PCC comprising a grid breaker B. Any microgrid 2 without a PCC, and thus a grid breaker B, with a distribution grid may be regarded as a microgrid segment, but is herein called a microgrid just as microgrids comprising at least one PCC, and thus grid breaker(s) B, with a distribution grid 3.

A DG G may, e.g., be a renewable energy source, such as comprising a wind turbine or photovoltaic (PV) power generator, or a combustion-based generator, such as a diesel generator. An energy storage S may, e.g., comprise a battery, capacitor or flywheel.

Reference is made to the examples of FIGS. 1-3. The arrangement 1 comprises a first microgrid 2a and a second microgrid 2b, separated by a microgrid breaker 4, as well as a microgrid control system comprising a plurality of MGCs 5, each of which is associated with a respective asset G, L, S or B of the arrangement, i.e., of either of the first and second microgrids. The first microgrid 2a comprises one grid breaker Ba, associated with a corresponding NW controller 5NWa, one load La, associated with a corresponding load controller 5La, one storage Sa, associated with a corresponding storage controller 5Sa, as well as a first DG Ga1 and a second DG Ga2, associated with corresponding first and second DG controllers 5Ga1 and 5Ga2. Similarly, the second microgrid 2b comprises one grid breaker Bb, associated with a corresponding NW controller 5NWb, one load Lb, associated with a corresponding load controller 5Lb, one storage Sb, associated with a corresponding storage controller 5Sb, as well as a first DG Gb1, a second DG Gb2 and a third DG Gb3, associated with corresponding first, second and third DG controllers 5Gb1, 5Gb2 and 5Gb3. Also the microgrid breaker 4 may be associated with an MGC 5, a breaker controller, (not shown) comprised in the control system.

Figure 2A:
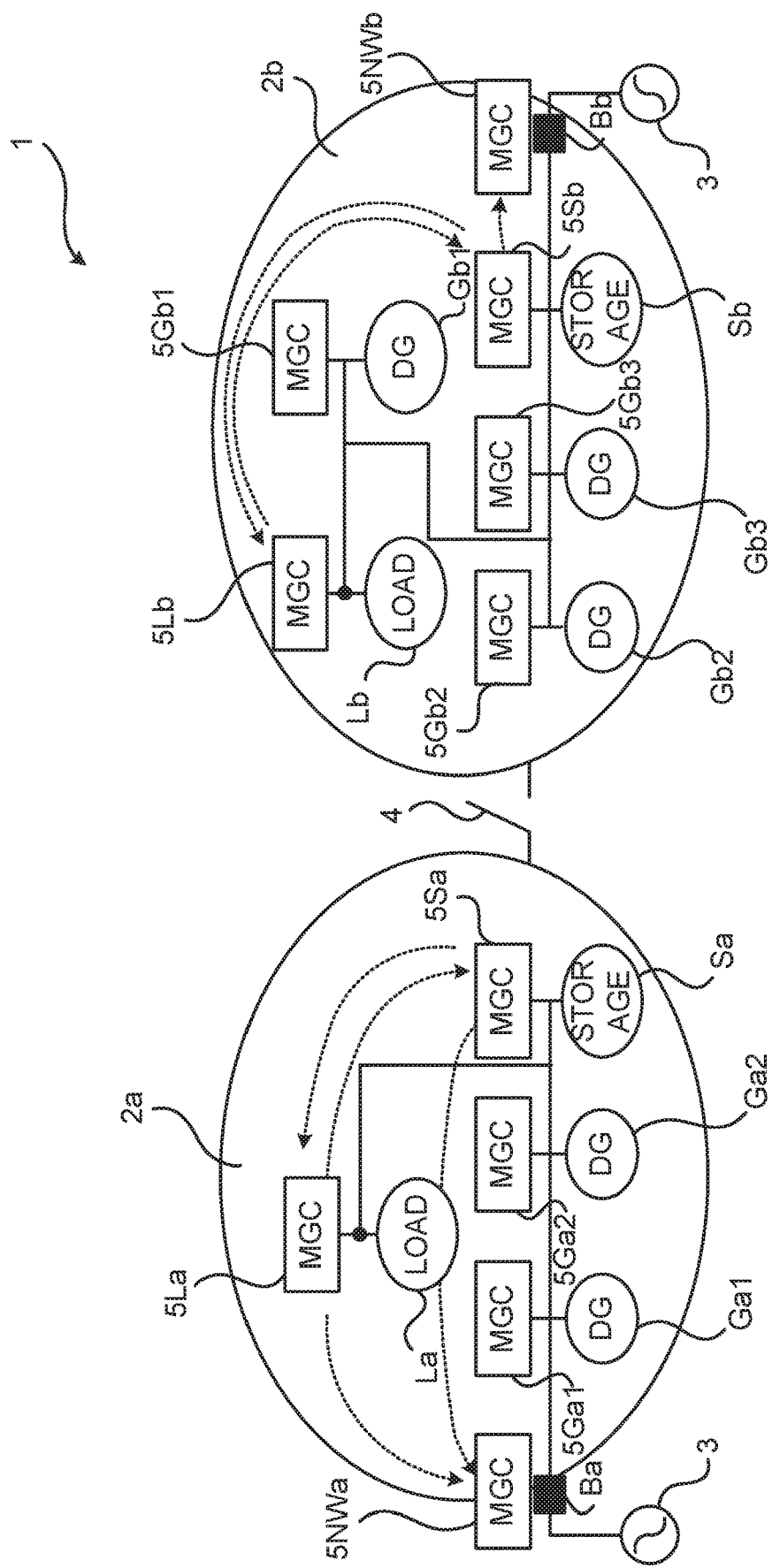
FIG. 2A is a schematic illustration of the nested microgrids of FIG. 1 with communication between some of their controllers for storage control in case the microgrid breaker is open, in accordance with an embodiment of the present invention.
Figure 2B:
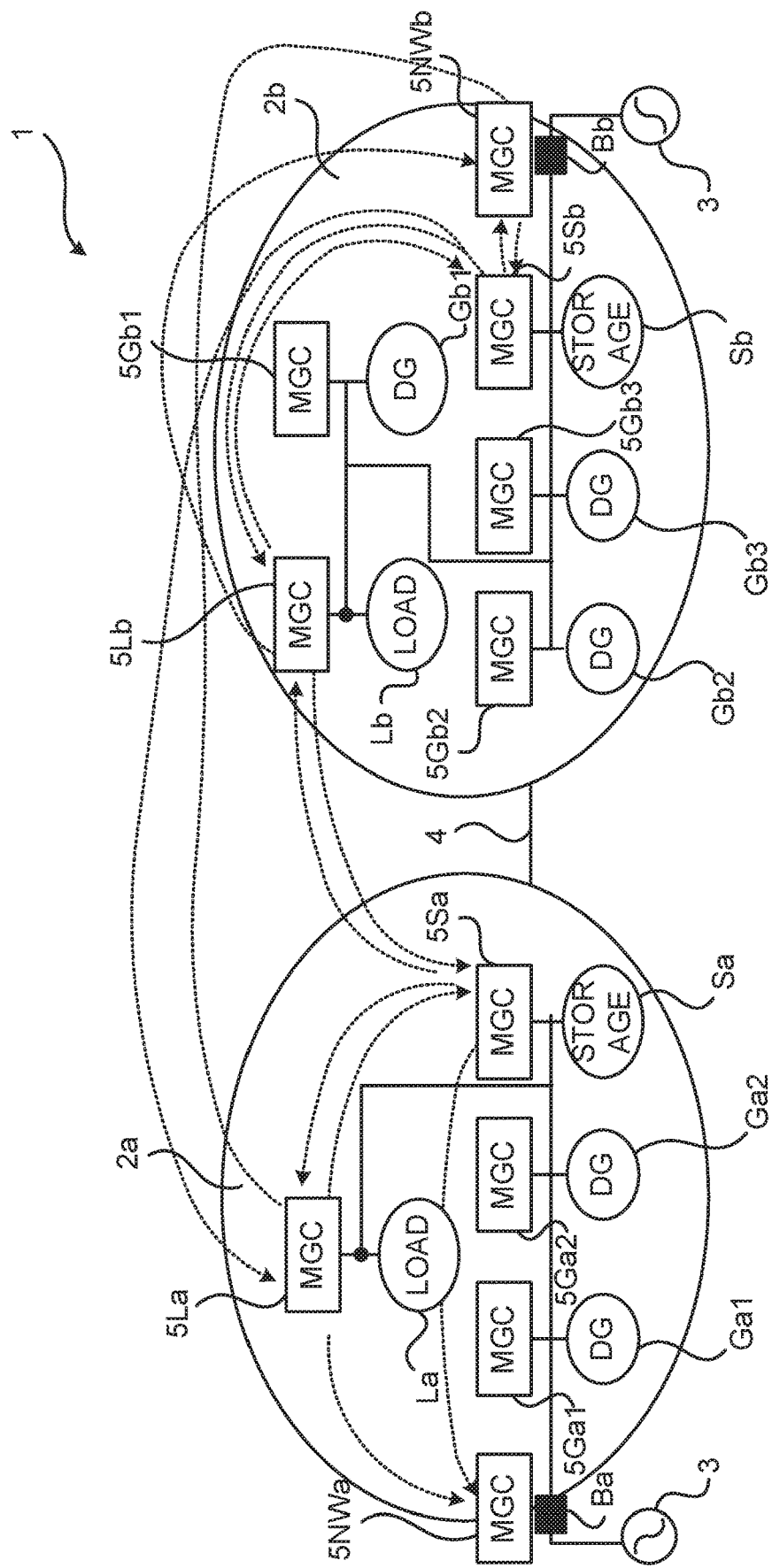
FIG. 2B is a schematic illustration of the nested microgrids of FIG. 2A with communication between some of their controllers for storage control in case the microgrid breaker is closed, in accordance with an embodiment of the present invention.

FIGS. 2A and 2B illustrate an example of information broadcasting within MGC groups formed in case the microgrid breaker 4 is open (FIG. 2A) and closed (FIG. 2B) for load voltage control by means of energy storage. The storage controller(s) receive voltage measurements of the load controller(s) of the loads L being controlled and control reactive power (Q) injection of the storage(s) into the microgrid (typically to a bus it is connected to) to control the load voltage. Storage reactive power control activation or limit is communicated to the load controller.

Thus, in FIG. 2A where the breaker is open, the load La is controlled by means of the storage Sa of the first microgrid, and the load Lb is controlled by means of the storage Sb of the second microgrid. Each of the storage controllers 5Sa and 5Sb receives information about voltage measurements from the load controller 5La or 5Lb within its own microgrid 2a and 2b, and in return broadcasts any of its State of Charge (SoC), Q control activation or limit (see dotted arrows in the figure) to, e.g., both the load controller 5La or 5Lb and the NW controller 5NWa or 5NWb. A first group of MGCs is thus in the first microgrid 2a formed by the load controller, the storage controller and the NW controller in the first microgrid, and in the second microgrid 2b formed by the load controller, the storage controller and the NW controller in the second microgrid.

When the breaker 4 is closed the reactive power control is instead performed with both the storages Sa and Sb as shown in FIG. 2B. In this case, the load voltage is broadcasted by each of the load controllers 5La and 5Lb to both storage controllers 5Sa and 5Sb and (optionally) one or both of the NW controllers 5NWa and 5NWb, these controllers 5 forming a second group of MGCs. Again, each of the storage controllers responds by broadcasting its SoC, Q control activation or limit in the second group.

Figure 3A:
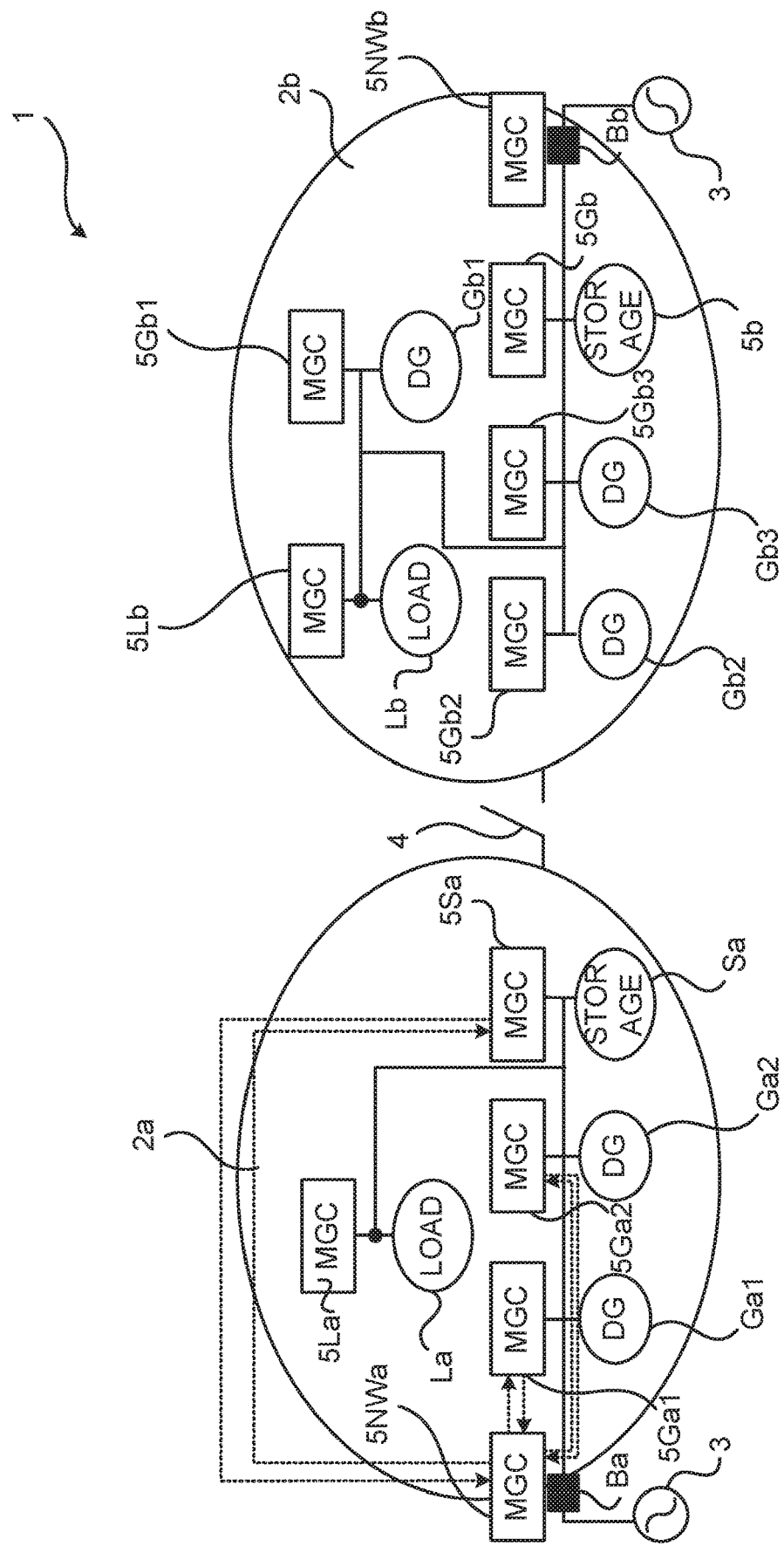
FIG. 3A is a schematic illustration of the nested microgrids of FIG. 1 with communication between some of their controllers for power control in case the microgrid breaker is open, in accordance with an embodiment of the present invention.
Figure 3B:
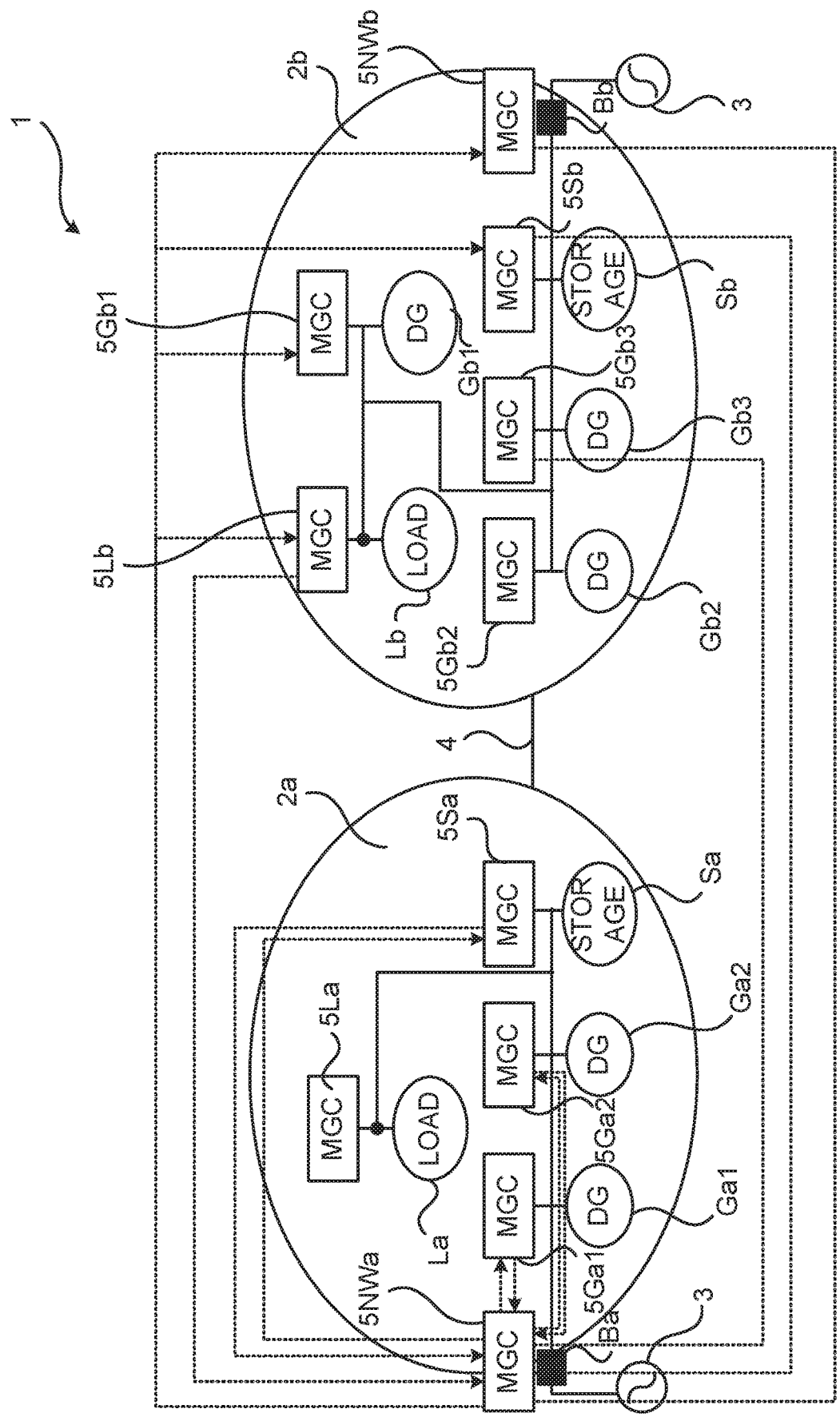
FIG. 3B is a schematic illustration of the nested microgrids of FIG. 3A with communication between some of their controllers for power control in case the microgrid breaker is closed, in accordance with an embodiment of the present invention.

FIGS. 3A and 3B illustrate an example of limiting the maximum power in the first microgrid 2a. To limit grid power in the first microgrid, the power limit, both real (P) and reactive (Q) is communicated by the NW controller 5NWa to all the DG controllers 5Ga1 and 5Ga2 and storage controller 5Sa in the first microgrid 2a when the microgrid breaker 4 is open. The respective measured value of power injected by each DG G and storage S in the first microgrid are communicated to the NW controller of the first microgrid. These controllers 5 of the first microgrid thus form a first MGC group.

When the breaker 4 is closed, the power limit of the first microgrid is instead communicated to all the DGs G and storages S in both the first and the second microgrids. Similarly all these assets' G and S power production P and Q is communicated to the network controller 5NWa of the first microgrid. The network controller 5NWb of the second microgrid may communicate the grid power of the second microgrid. These MGCs 5 of both the first and the second microgrids thus form the second MGC group.

Figure 4:
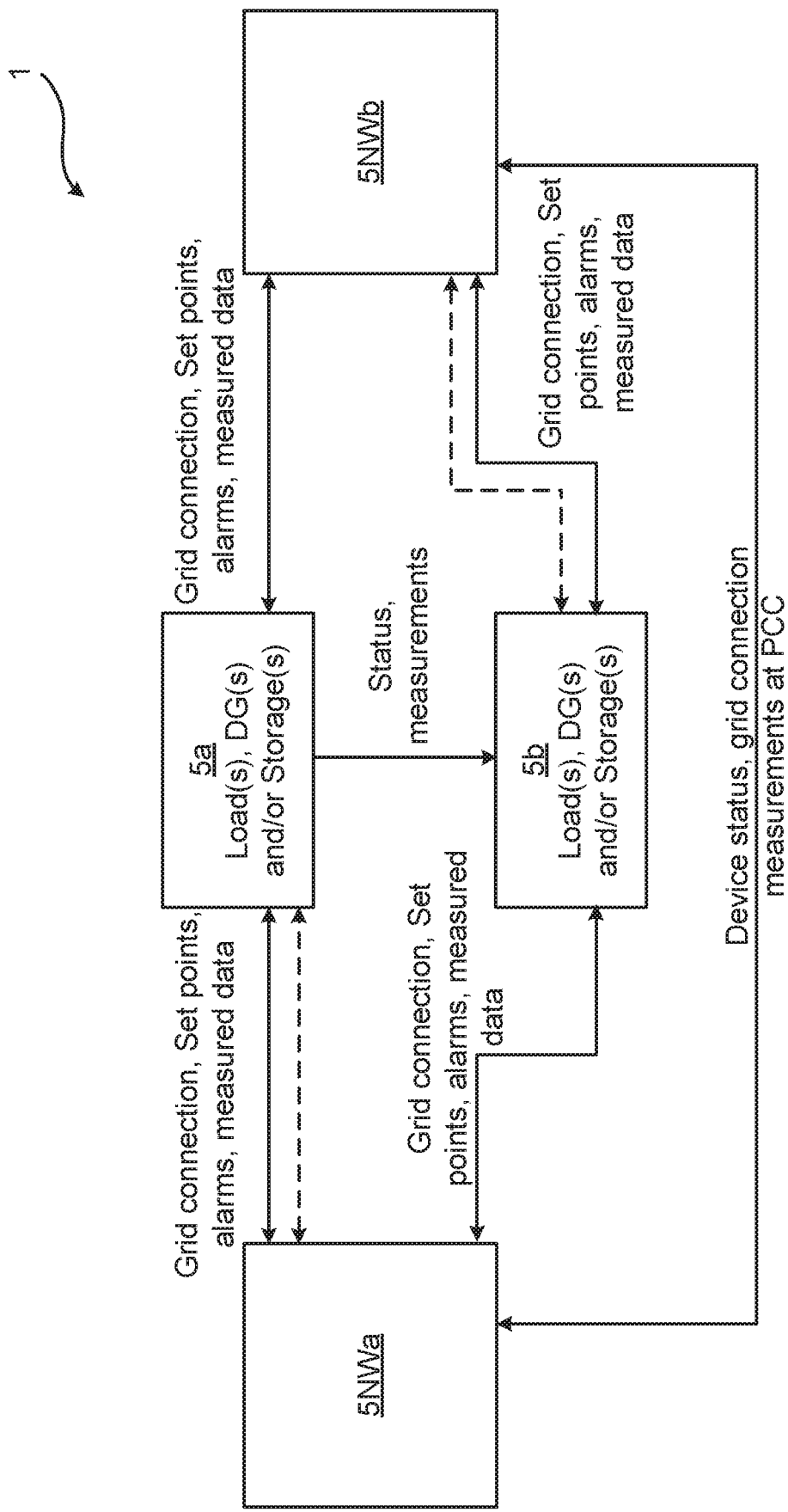
FIG. 4 is a schematic block diagram illustrating network controller communication of two nested microgrids when the microgrid breaker there between is open and closed, respectively, in accordance with embodiments of the present invention.

FIG. 4 more generally illustrates example communication flows in the microgrid arrangement 1 when the microgrid breaker 4 is open and closed, respectively. In the figure, the first microgrid 2a is schematically represented by the first NW controller 5NWa and the other asset controllers 5a of the first microgrid. Similarly, the second microgrid 2b is represented by the second NW controller 5NWb and the other asset controllers 5b of the second microgrid. As indicated by the dashed double-headed arrows, when the microgrid breaker 4 is open, communication occurs between the NW controller 5NWa in the first microgrid and the further assets L, G and/or S in the first microgrid, and between the NW controller 5NWb in the second microgrid and the further assets L, G and/or S in the second microgrid. There is no need for communication between MGCs 5 of different microgrids, why two separate (first) MGC broadcast groups, one per microgrid, is used for the communication between the MGCs 5 in the arrangement. On the other hand, as indicated by the solid double-headed arrows, when the microgrid breaker 4 is closed, MGCs 5 are included in a single and larger communal (second) broadcasting group for both the first and second microgrids in the arrangement. Thus, each NW controller communicates also with the NW controller and the assets of the microgrid which it is itself not part of. Also, assets of any one of the microgrids may communicate, directly or via a NW controller, with assets of the other one of the microgrids.

Figure 5:
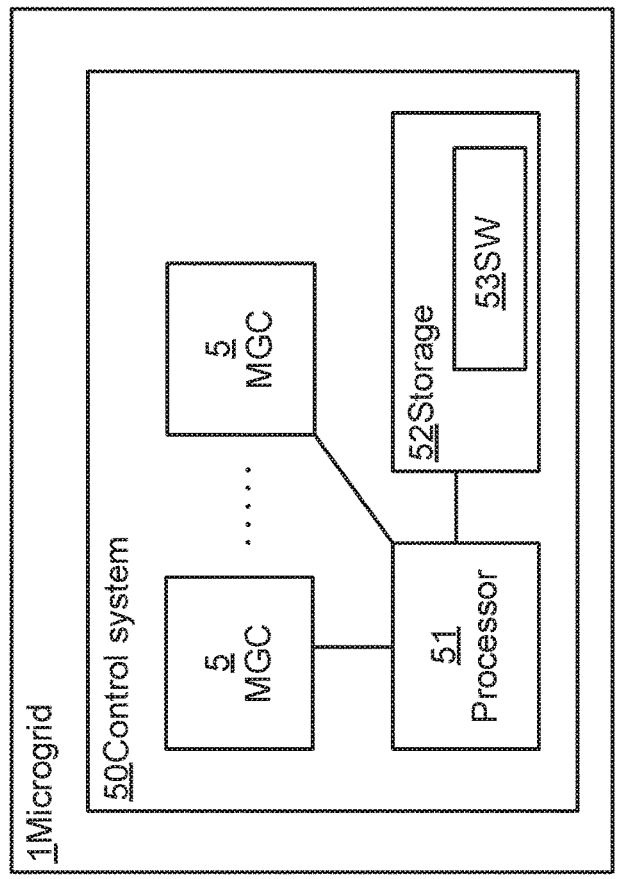
FIG. 5 is a schematic block diagram of an embodiment of a control system comprised in a microgrid arrangement, in accordance with the present invention.

FIG. 5 schematically illustrates an embodiment of a microgrid control system 50 comprised in the microgrid arrangement 1. The system 50 comprises the MGCs 5 associated with each of the assets B, L, G and/or S in the arrangement 1. Further, the system 50 comprises processing circuitry 51, e.g., a central processing unit (CPU). The processing circuitry 51 may comprise one or a plurality of processing units in the form of microprocessor(s). However, other suitable devices with computing capabilities could be comprised in the processing circuitry 51, e.g., an application specific integrated circuit (ASIC), a field programmable gate array (FPGA) or a complex programmable logic device (CPLD). The processing circuitry 51 is configured to run one or several computer program(s) or software (SW) 53 stored in a storage 52 of one or several storage unit(s), e.g., a memory. The storage unit 52 is regarded as a computer readable means as discussed herein and may, e.g., be in the form of a Random Access Memory (RAM), a Flash memory or other solid state memory, or a hard disk, or be a combination thereof. The processing circuitry 51 may also be configured to store data in the storage 52, as needed.

Embodiments of the method of the present invention may be performed by the system 50, comprised in the arrangement 1, which system comprises the processing circuitry 51 associated with data storage 52. The processing circuitry may be equipped with one or more processing units CPU in the form of microprocessor(s) executing appropriate software stored in associated memory for procuring required functionality. However, other suitable devices with computing capabilities could be comprised in the processor, e.g., an application specific integrated circuit (ASIC), a field programmable gate array (FPGA), a complex programmable logic device (CPLD), etc., in order to control the arrangement 1 and perform embodiments of the method of the present disclosure, while executing appropriate software 53, e.g., stored in a suitable data storage 52, such as a RAM, a Flash memory or a hard disk, or in the processing circuitry itself (as, e.g., in case of an FPGA).

Embodiments of the present invention may be conveniently implemented using one or more conventional general purpose or specialized digital computer, computing device, machine, or microprocessor, including one or more processors 51, memory 52 and/or computer readable storage media 52 programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) 52 having instructions 53 stored thereon/in which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Figure 6:
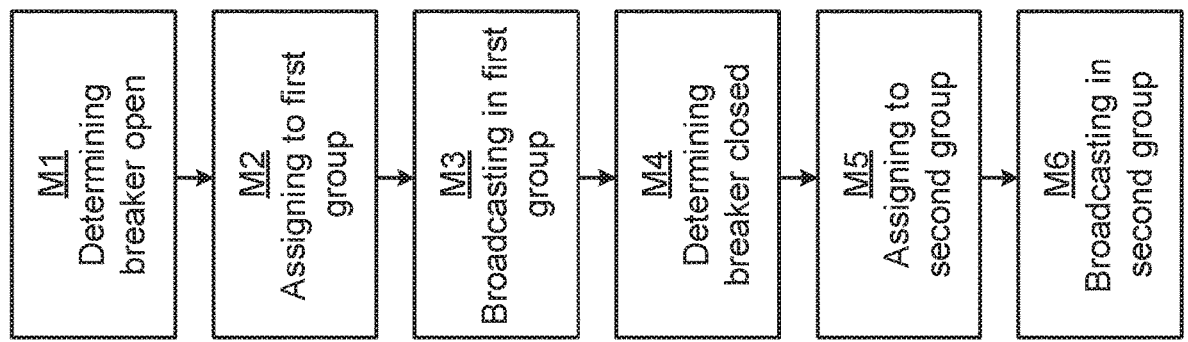
FIG. 6 is a schematic flow chart of an embodiment of the method of the present invention.

FIG. 6 is a schematic flow chart illustrating method steps M in accordance with the present invention. The method is performed in the microgrid control system 50 comprised in the microgrid arrangement 1. The arrangement 1 comprises at least a first microgrid 2a and a second microgrid 2b separated by a microgrid breaker 4. Each of the first and second microgrids comprises a plurality of assets G, L, S and/or B, each asset being associated with a respective MGC 5 of the microgrid control system 50. The method comprises determining M1 that the microgrid breaker 4 is open. The method also comprises, based on the determination M1 that the microgrid breaker is open, for at least one MGC 5 of the MGCs in the first microgrid 2a, assigning M2 the MGC to a first group of MGCs in the first microgrid. The method also comprises the MGC 5 broadcasting M3 information to the MGCs in the first group, which are all comprised in the first microgrid 2*a*. The method also comprises determining M4 that the microgrid breaker 4 is closed. The method also comprises, based on the determination M4 that the microgrid breaker is closed, assigning M5 the MGC 5 to a second group of MGCs in both the first microgrid 2*a* and the second microgrid 2*b*. The method also comprises the MGC 5 broadcasting M6 information to the MGCs in the second group, of which MGCs some are comprised in the first microgrid 2*a* and some others are comprised in the second microgrid 2*b*.

In some embodiments of the present invention, the first group comprises all MGCs 5 in the first microgrid 2*a*, and wherein the second group comprises all MGCs in both the first and the second microgrids 2*a* and 2*b*. In some other embodiments, the first group comprises a selection of less than all MGCs 5 in the first microgrid 2*a*, and wherein the second group comprises a selection of less than all MGCs in the first and second microgrids 2*a* and 2*b*.

In some embodiments of the present invention, the MGC is a network controller 5NWa associated with an asset in the form of a grid breaker Ba arranged to control the connection of the first microgrid 2*a* to a power distribution grid 3. In some embodiments, the information being broadcasted M3 and/or M6 to the first and/or the second group comprises set-points.

In some embodiments of the present invention, the MGC is a storage controller 5S associated with an asset in the form of an energy storage S.

In some embodiments of the present invention, the MGC is a DG controller 5G associated with an asset in the form of a Distributed Generator G.

In some embodiments of the present invention, the information being broadcasted M3 and/or M6 to the first and/or the second group comprises any of power, voltage and frequency of the asset with which the MGC is associated.

In some embodiments of the present invention, the second microgrid 2*b* comprises no asset in the form of a grid breaker Bb connecting the second microgrid to a power distribution grid 3, e.g., the second microgrid could be regarded as a segment of the same grid-connected microgrid as the first microgrid.

The change from broadcasting M3 in the first group (e.g., of all or some of the MGC 5 in the first microgrid 2*a*) to broadcasting M6 in the second group (e.g., of all or some of the MGC 5 in both the first and the second microgrids 2*a* and 2*b*) may be facilitated by means of the NW controller(s) 5NWa and/or 5NWb of the first and/or second microgrids. For instance, the determining M4 that the microgrid breaker 4 is closed may include signaling, e.g., from an MGC controller associated with the microgrid breaker 4, comprising information about that the microgrid breaker is closed being received by the NW controllers 5NWa and 5NWb of the first and second microgrids. Based on the information that the breaker 4 is closed, each NW controller 5NW may be aware of the respective addresses, e.g., IP addresses or similar, of each of the other MGC 5 in its microgrid and may send information about these addresses to the other microgrid, e.g., to the NW controller of the other microgrid which MCG controller may inform the other MGC 5 of the other microgrid of the addresses. Thus, the NW controller 5NWa of the first microgrid 2*a* may, upon receiving information that the microgrid breaker 4 is closed, send information about the addresses of each of the MGC 5*a* of the first microgrid to the NW controller 5NWb of the second microgrid which may then forward this information to each of the MGC 5*b* of the second microgrid. Similarly, the NW controller 5NWb of the second microgrid 2*b* may, upon receiving information that the microgrid breaker 4 is closed, send information about the addresses of each of the MGC 5*b* of the second microgrid to the NW controller 5NWa of the first microgrid which may then forward this information to each of the MGC 5*a* of the first microgrid. In this way, the MGC in the first microgrid knows the addresses of also the MGC in the second group which are in the second microgrid, in addition to the MGC in the second group which are from the first microgrid which may typically be the same as in the first group. Each NW controller 5NW may also coordinate group formation and spreading of address information within its own microgrid, e.g., such that each of the MGC 5*a* of the first microgrid in the first group is informed of the respective address of each of the other MGC in the first group before broadcasting M3 in the first group. In case only one of the first and second microgrids comprises a NW controller 5NW, this NW controller may coordinate group formation and spreading of address information within both of the first and second microgrids.

In some embodiments of the present invention, the determining M4 that the microgrid breaker is closed comprises information about that the microgrid breaker 4 is closed being received by a network controller 5NWa associated with an asset in the form of a grid breaker Ba arranged to control the connection of the first microgrid 2*a* to a power distribution grid 3. In some embodiments, the network controller 5NWa, in response to the determining M4 that the microgrid breaker is closed, sends address information about MGCs 5*a* in the first microgrid 2*a* to the second microgrid 2*b* and, from the second microgrid, receives address information about MGCs 5*b* in the second microgrid, before the broadcasting M6 in the second group. In some embodiments, the sent address information is sent to, and the received address information is received from, a network controller 5NWb associated with an asset in the form of a grid breaker Bb arranged to control the connection of the second microgrid 2*b* to a power distribution grid 3.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of operating a microgrid control system to control a microgrid arrangement comprising a first microgrid and a second microgrid separated by a microgrid breaker, the first and second microgrids each comprising a plurality of assets, each asset being associated with a respective microgrid controller (MGC) of the microgrid control system, the method comprising:
   determining that the microgrid breaker is open;
   based on the determination that the microgrid breaker is open, for at least one MGC of the MGCs in the first microgrid, assigning the MGC to a first group of MGCs in the first microgrid;
   broadcasting information from the MGC to other MGCs in the first group;
   determining that the microgrid breaker is closed;
   based on the determination that the microgrid breaker is closed, assigning the MGC to a second group of MGCs in both the first microgrid and the second microgrid; and
   broadcasting information from the MGC to MGCs in the second group.

2. The method of claim 1, wherein the method comprises operating a decentralized microgrid control system without use of a control central unit.

3. The method of claim 1, wherein the first group comprises every MGC in the first microgrid, and wherein the second group comprises every MGC in both the first and the second microgrids.

4. The method of claim 1, wherein the first group comprises some but not all MGCs in the first microgrid, and wherein the second group comprises some but not all MGCs in the first and second microgrids.

5. The method of claim 1, wherein the MGC is a network controller associated with an asset in the form of a grid breaker arranged to control a connection of the first microgrid to a power distribution grid.

6. The method of claim 5, wherein broadcasting information from the MGC to other MGCs in the first group comprises broadcasting set-points.

7. The method of claim 5, broadcasting information from the MGC to MGCs in the second group comprises broadcasting set-points.

8. The method of claim 1, wherein the MGC is a storage controller associated with an asset in the form of an energy storage.

9. The method of claim 1, wherein the MGC is a DG controller associated with an asset in the form of a distributed generator.

10. The method of claim 1, wherein the information being broadcasted to the first or the second group comprises any of power, voltage and frequency of the asset with which the MGC is associated.

11. The method of claim 1, wherein determining that the microgrid breaker is closed comprises receiving information indicating that the microgrid breaker is closed at a network controller associated with an asset in the form of a grid breaker that is arranged to control a connection of the first microgrid to a power distribution grid.

12. The method of claim 11, further comprising:
sending, from the network controller, address information about MGCs in the first microgrid to the second microgrid in response to the determining that the microgrid breaker is closed; and
before broadcasting in the second group, receiving address information about MGCs in the second microgrid from the second microgrid.

13. The method of claim 12, wherein the sent address information is sent to, and the received address information is received from, a network controller associated with a second asset in the form of a grid breaker arranged to control a connection of the second microgrid to the power distribution grid.

14. The method of claim 1, wherein the second microgrid comprises no asset in the form of a grid breaker connecting the second microgrid to a power distribution grid.

15. A computer program product comprising computer-executable components for causing a microgrid control system to perform the method of claim 1 when the computer-executable components are run on processing circuitry comprised in the microgrid control system.

16. A microgrid control system for a microgrid arrangement comprising at least a first microgrid and a second microgrid separated by a microgrid breaker and each comprising a plurality of assets, the microgrid control system comprising:
a respective microgrid controller (MGC) configured for being associated with each of the assets;
processing circuitry; and
data storage storing instructions executable by the processing circuitry to control the control system to:
determine that the microgrid breaker is open;
based on the determination that the microgrid breaker is open, assign a first MGC in the first microgrid to a first group of MGCs in the first microgrid;
cause the first MGC to broadcast information to the other MGCs in the first group;
determine that the microgrid breaker is closed;
based on the determination that the microgrid breaker is closed, assign the first MGC to a second group of MGCs in both the first microgrid and the second microgrid; and
cause the first MGC to broadcast information to the MGCs in the second group.

17. A microgrid arrangement comprising:
the microgrid control system of claim 16;
the first microgrid; and
the second microgrid that is separated from the first microgrid by the microgrid breaker.

18. The microgrid control system of claim 16, wherein the microgrid control system comprises a decentralized microgrid control system that does not include a central unit.

19. A microgrid arrangement comprising:
a first microgrid;
a second microgrid, wherein the first and second microgrids each comprise a plurality of assets;
a microgrid breaker separating the first microgrid and the second microgrid; and
a decentralized microgrid control system that includes a plurality of microgrid controllers (MGCs), each MGC being associated with a respective asset, wherein the microgrid control system is configured to:
determine that the microgrid breaker is open;
based on the determination that the microgrid breaker is open, assign the MGC in the first microgrid to a first group of MGCs in the first microgrid;
broadcast information from the first MGC to other MGCs in the first group;
determine that the microgrid breaker is closed;
based on the determination that the microgrid breaker is closed, assign the first MGC to a second group of MGCs in both the first microgrid and the second microgrid; and
broadcast information from the first MGC to MGCs in the second group.

20. The microgrid arrangement of claim 19, wherein the microgrid control system comprises a decentralized microgrid control system that does not include a central unit.

* * * * *